(12) United States Patent
Danovitz

(10) Patent No.: US 10,623,821 B2
(45) Date of Patent: Apr. 14, 2020

(54) METHOD AND APPARATUS FOR CREATING AND SHARING CUSTOMIZED MULTIMEDIA SEGMENTS

(71) Applicant: TiVo Solutions Inc., San Carlos, CA (US)

(72) Inventor: Joshua Danovitz, Alviso, CA (US)

(73) Assignee: TiVo Solutions Inc., San Jose, CA (US)

( * ) Notice: Subject to any disclaimer, the term of this patent is extended or adjusted under 35 U.S.C. 154(b) by 0 days.

(21) Appl. No.: 14/483,127

(22) Filed: Sep. 10, 2014

(65) Prior Publication Data

US 2015/0074700 A1 Mar. 12, 2015

Related U.S. Application Data

(60) Provisional application No. 61/876,214, filed on Sep. 10, 2013.

(51) Int. Cl.
| | |
|---|---|
| *H04N 21/482* | (2011.01) |
| *H04N 21/25* | (2011.01) |
| *H04N 21/258* | (2011.01) |
| *H04N 21/262* | (2011.01) |
| *H04N 21/2668* | (2011.01) |

(Continued)

(52) U.S. Cl.
CPC ....... *H04N 21/4826* (2013.01); *H04N 21/252* (2013.01); *H04N 21/25891* (2013.01); *H04N 21/2668* (2013.01); *H04N 21/26283* (2013.01); *H04N 21/2743* (2013.01); *H04N 21/4756* (2013.01); *H04N 21/4788* (2013.01); *H04N 21/6125* (2013.01); *H04N 21/6175* (2013.01); *H04N 21/812* (2013.01); *H04N 21/8545* (2013.01); *H04N 21/8549* (2013.01); *H04N 21/8586* (2013.01)

(58) Field of Classification Search
CPC ........... H04N 21/252; H04N 21/25891; H04N 21/26283; H04N 21/2668; H04N 21/2743; H04N 21/4756; H04N 21/4788; H04N 21/4826; H04N 21/6125; H04N 21/6175; H04N 21/812; H04N 21/8545; H04N 21/8549; H04N 21/8586
USPC ......................... 725/105, 109, 114–115, 131
See application file for complete search history.

(56) References Cited

U.S. PATENT DOCUMENTS

| | | |
|---|---|---|
| 6,233,389 B1 | 5/2001 | Barton |
| 6,847,778 B1 | 1/2005 | Vallone |

(Continued)

OTHER PUBLICATIONS

Cutts, Matt; "Link to a specific part of a YouTube video", Mar. 4, 2009; mattcuts.com, pp. 1-7.*

*Primary Examiner* — Nicholas T Corbo
(74) *Attorney, Agent, or Firm* — Haley Guiliano LLP

(57) ABSTRACT

Multimedia content segment identified by users may be shared among media devices and media device users. Media content segment metadata is generated based on one or more identified media content item segments identified in one or more media content items. The media content segment metadata may include, but is not limited to, information indicating segment start and stop times, information about the particular media content item (e.g., title, actors, original air date), and other user-provided descriptive information. A link for the media content segment metadata may be posted for display on a webpage and which enables other users to access the media content segment metadata.

23 Claims, 12 Drawing Sheets

(51) Int. Cl.
     *H04N 21/2743*     (2011.01)
     *H04N 21/475*      (2011.01)
     *H04N 21/4788*     (2011.01)
     *H04N 21/61*       (2011.01)
     *H04N 21/81*       (2011.01)
     *H04N 21/8545*     (2011.01)
     *H04N 21/8549*     (2011.01)
     *H04N 21/858*      (2011.01)

(56) References Cited

U.S. PATENT DOCUMENTS

| | | | |
|---|---|---|---|
| 7,873,982 B2 | 1/2011 | Smith | |
| 8,417,096 B2 | 4/2013 | Gharaat | |
| 9,734,151 B2 | 8/2017 | Patel | |
| 9,967,534 B1 | 5/2018 | Flannery | |
| 2007/0101394 A1* | 5/2007 | Fu | G11B 27/105 725/134 |
| 2007/0260604 A1* | 11/2007 | Haeuser | H04L 63/10 |
| 2008/0127270 A1* | 5/2008 | Shipman | G06F 17/30843 725/46 |
| 2010/0332560 A1* | 12/2010 | Gerbasi, III | G11B 27/034 707/812 |
| 2011/0066942 A1 | 3/2011 | Barton | |
| 2011/0320526 A1* | 12/2011 | Bhogal | G06F 17/30902 709/203 |
| 2012/0096357 A1* | 4/2012 | Folgner | G11B 27/34 715/726 |
| 2013/0290845 A1* | 10/2013 | Rudman | G11B 27/034 715/716 |
| 2013/0311575 A1* | 11/2013 | Woods | H04N 21/6582 709/206 |
| 2015/0082349 A1* | 3/2015 | Ishtiaq | H04N 21/23418 725/40 |

* cited by examiner

METHOD AND APPARATUS FOR CREATING AND SHARING CUSTOMIZED MULTIMEDIA SEGMENTS

CROSS REFERENCE TO RELATED APPLICATIONS

This application claims benefit of U.S. Provisional Patent Application Ser. No. 61/876,214, filed Sep. 10, 2013, the entire contents of which are hereby incorporated by reference as if fully set forth herein.

FIELD OF THE INVENTION

Embodiments relate generally to creating and sharing customized multimedia content segments among media devices and media device users.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A multimedia device may receive multimedia content streams for display to a user. For example, a digital video recorder (DVR) device may receive multimedia content streams and enable a user of the DVR device to record and view multimedia content. As another example, portable display devices such as laptops, tablet computers, and cell phones have become increasingly popular and widely used for viewing TV programs and other media content.

Multimedia content received by media devices generally is presented in a fixed and non-editable format. A media device user may be able to play the media content, scan the media content, and jump to particular points in the media content via scene selections created by a producer of the media content. However, the viewing of media content generally is a passive activity otherwise and user interaction with the media content, and with other media device users, is minimal.

Social networking services are an increasingly popular platform for enabling users to post and share information with other users who may share similar interests or other social relationships. Information posted by users on social networking websites may include status updates, images and videos, and links to other web-based resources that may be of interest.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
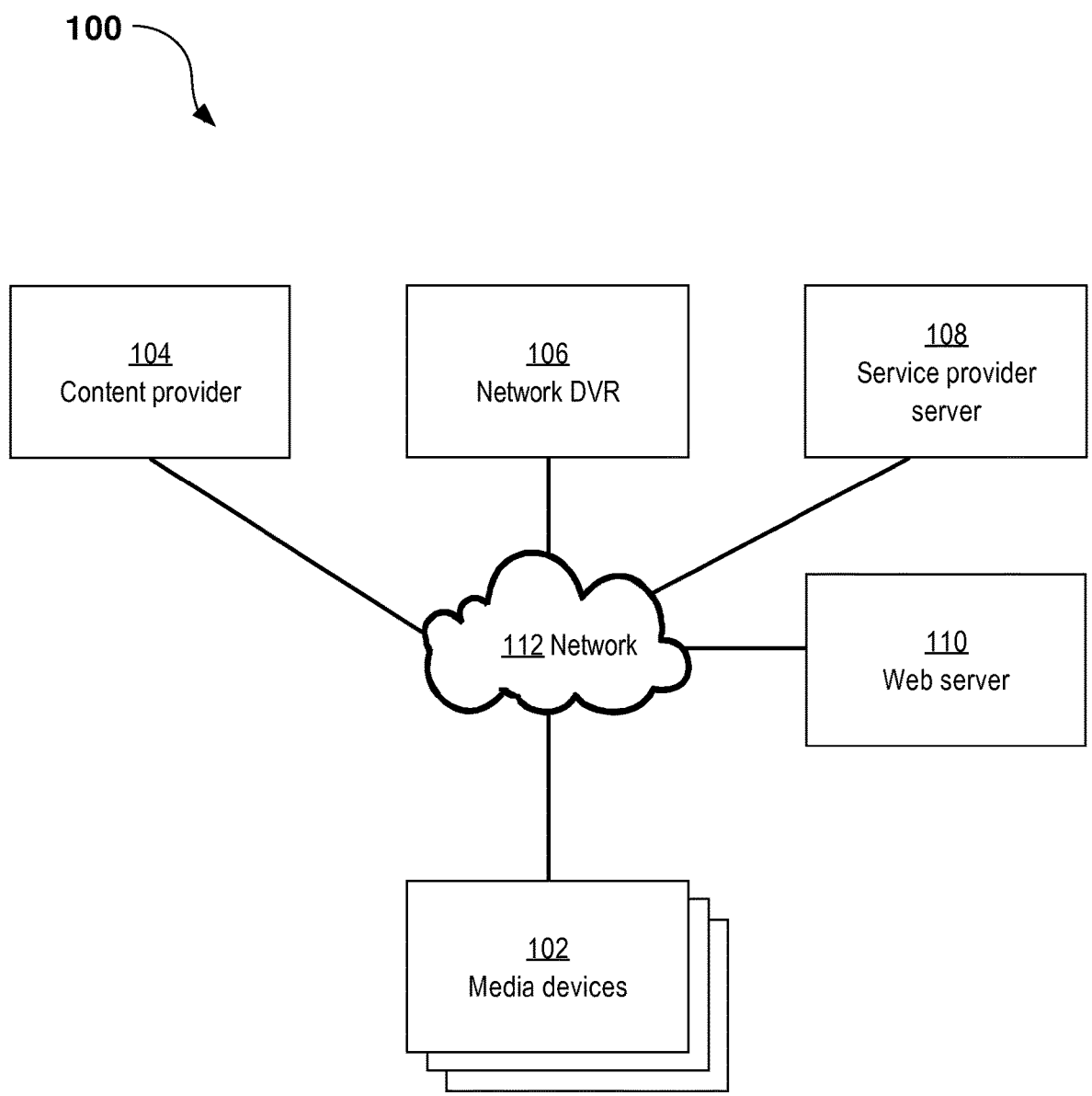
FIG. 1A is a block diagram of an example system in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Example Features are Described According to the Following Outline:
 1.0 Functional Overview
 2.0 System Architecture
 3.0 Example Media Device
 4.0 Creating and Sharing Media Content Segments
 4.1 Creating Media Content Segments
 4.2 Managing Media Content Segment Metadata
 4.3 Viewing Custom Media Content Segments
 5.0 Example Implementation
 6.0 Hardware Overview
 7.0 Extensions and Alternatives

1.0 Functional Overview

In an embodiment, a media device is configured to receive input identifying one or more segments of one or more media content items and to generate metadata that describes the one or more identified media content segments. Examples of a media content item include a television program, movie, music video, etc. A segment of a media content item generally represents any portion of the media content item that may be identified by a start time and end time. In one embodiment, media content segments may be created using one or more graphical user interfaces that enable users to identify media content segments in a simple, visually intuitive manner.

In an embodiment, media content segment metadata may be generated based on one or more identified media content segments to enable saving and sharing of the identified media content segments, among other features. The media content segment metadata may include, for example, information indicating segment start times and end times, information about the media content item(s) of which the media content segments are a part (e.g., title, actors, original air date, etc.), user-provided descriptive information, etc. Media content segment metadata generated for one or more media content items may be stored locally on a user's media device, at a remote storage location, and/or sent to other devices.

In an embodiment, media content segment metadata may be shared with other users. For example, a first user may be watching a television program using a first media device and the first user may identify particular segments of the television program that may be of interest to other users. In this example, the first user may cause media content segment metadata to be generated for the identified segments and may further cause information associated with the identified segments to be published on a website such as social networking website or blog. A second user may interact with the published information, for example, by selecting a link to access the media content segment metadata generated by the first user. The same television program may then be played on the second user's media device according to the media content segment metadata, e.g., the particular segments identified by the first user may be played on the second user's media device.

In an embodiment, selecting a link associated with media content segment metadata published on a web page or other location may generate a request sent to a networked media device or other server storing the media content segment metadata. A networked media device may, for example, provide DVR-like or Video On Demand (VOD)-like functions accessible to various media devices via the Internet. In an embodiment, in response to receiving a request for media content segment metadata associated with one or more media content items, a networked media device may determine whether a user associated with the requesting media device is eligible to access the one or more media content items. The networked media device may determine whether the user is eligible to access the one or more media content items based on account information associated with the user and which indicates particular content sources and/or content items to which the user has permission to access. In response to determining that the user is eligible to access the one or more media content items, the one or more media content items may be associated with the user's account and/or the one or more media content items may be sent to one or more of the user's media devices for display.

In an embodiment, one or more media content items may be displayed according to media content segment metadata. For example, in response to a user accessing a link or otherwise selecting particular media content segment metadata, the segments of one or more media content items identified by the media content segment metadata may be displayed on a media device. Playing one or more media content items according to media content segment metadata, for example, may enable viewing of particular segments of a media content item identified by another user.

2.0 System Architecture

Although a specific computer architecture is described herein, other embodiments of the invention are applicable to any architecture that can be used to perform the functions described herein.

FIG. 1A is a block diagram illustrating an example system 100 in accordance with an embodiment. Although a specific system is described, other embodiments are applicable to any system that can be used to perform the functionality described herein. Components of the system 100 may be connected, for example, via a network 112. Network 112 may be implemented by any medium or mechanism that provides for the exchange of data between components of the system 100. Examples of network 112 include, without limitation, a network such as a Local Area Network (LAN), Wide Area Network (WAN), wireless network, the Internet, Intranet, Extranet, etc. Any number of devices within the system 100 may be directly connected to each other through wired or wireless communication segments.

In an embodiment, the system 100 includes one or more media devices (for example, media devices 102), one or more content providers (for example, content provider 104), one or more network digital video recorder (DVR) devices (for example, network DVR 106), one or more service providers (for example, service provider server 108), and one or more web servers (for example, web server 110). Each of these components are presented to clarify the functionalities described herein and may not be necessary to implement all embodiments. Furthermore, components not shown in FIG. 1 may also be used to perform the functionalities described herein. Functionalities described as performed by one component may instead be performed by another component.

In an embodiment, media devices 102 generally represent any devices configured to receive, store, display, or otherwise interact with media content. Examples of media devices 102 include, but are not limited to, any of: a digital video recorder (DVR), a television, a monitor, a laptop, a tablet computer, a kiosk, a cellular phone, a smart phone, a gaming console, etc. A media device 102 may include multiple components, e.g., a display screen, a projector, etc.

In an embodiment, content provider 104 provides broadcast program content, on-demand program content, over-the-top content (OTT), or any other type of content to media devices 102 and/or network DVR 106 via cable, satellite, terrestrial communication, network communications, or other transmission method. In an embodiment, content provider 104 provides multimedia content items, such as any downloadable content, through network 112 to media devices 102 and network DVR 106. As used herein, the term "media content item" generally refers to any kind of media content. A media content item may be, for example, audiovisual media (e.g., a video, advertisement, movie, or television program, etc.), audio without any video (e.g., music, etc.), or a computer-executable application (e.g., a video game, presentation program, chat program, etc.).

In an embodiment, network DVR 106 generally represents a networked media device that may perform one or more functions of a digital video recorder (DVR). For example, network DVR 106 may receive, record, and store media content items and send media content items to one or more media devices 102 via network 112. Network DVR 106 may be configured, among other features, to provide access to electronic programming guide (EPG) data and to enable users to schedule recordings of media content items. Whereas a DVR device typically may be used locally by one or a small number of users, a networked media device may support any number of users distributed across any number of different locations via network 112. For example, a first user using a portable device at one location may access network DVR 106 and cause media content to be recorded by network DVR 106 and may cause network DVR 106 to stream the media content for display on a portable device. As another example, a second user using a gaming console at a second location may access network DVR 106 and cause network DVR 106 to send content for display on the second user's gaming console.

In one embodiment, network DVR 106 may be configured to store and to provide access to media content items in association with registered user accounts. For example, a user may register an account with network DVR 106 and be provided with an amount of storage space available for storing recorded media content items and other data. The media content items originally may be available, for example, as broadcast content, on-demand content, internet accessible media content, user-generated content, or any type of media content. A user may access media content items stored in the user's account using any number of different media devices 102 and from any number of different locations.

In an embodiment, network DVR 106 may store user information in association with user accounts. User information stored by a network DVR 106 may include, but is not limited to, a list of content providers, content sources, and other services to which the user has access, an amount of available storage space for storing media content and other data, information about recorded media content and scheduled media content recordings, user-generated media content segment metadata, social networking account information, a list of multimedia devices associated with a user, etc.

As used herein, media content segment metadata generally refers to information that identifies and describes one or more segments, or "clips," of one or more media content items. In one embodiment, a user may generate media content segment metadata for media content items using one or more graphical user interfaces, as discussed in greater detail herein. A user may cause media content segment metadata to be stored locally on a media device 102 and/or in association with the user's account on a network DVR 106 for later viewing and for sharing across other media devices and with other users.

In an embodiment, a network DVR 106 may be associated with an Internet domain name. For example, a user may access a network DVR 106 using a web browser or other application running on a media device 102 by providing user account credentials. Media content items, media content segment metadata, and other information stored by a network DVR may be associated with uniform resource locators (URLs) that identify a location of the stored data. The association of data stored by a network DVR 106 with URLs may, for example, facilitate sharing and access to the data across various devices and among various users.

In an embodiment, a network DVR 106 is configured to receive requests from users for particular media content items and/or media content segment metadata. In one embodiment, in response to receiving a request for media content segment metadata, a network DVR 106 may be configured to determine whether a requesting user has access to the media content item(s) associated with the metadata, and if so, be configured to send media content and media content segment metadata to a requesting media device.

In one embodiment, media devices 102 and network DVR 106 may communicate with service provider server 108, which may provide information such as program guide data, graphical resources (such as fonts, pictures, etc.), service information, software, advertisements, segment metadata, and other data that enables media devices 102 and network DVR 106 to operate independently of service provider server 108 to satisfy user interests. In an embodiment, media devices 102 and network DVR 106 can communicate with each other to transfer content, media content segment metadata, or any other data through network 112 or any other communication connection.

In an embodiment, media devices 102 and network DVR 106 may interact with a web server 110. A web server 110 may, for example, represent a server hosting a web-based application that facilitates sharing of data such as media content segment metadata between media devices. For example, a web server 110 may be associated with a social networking service, a chat or instant messaging service, a blogging service, etc. Media devices 102 and/or network DVR 106 may send to a web server 110 information including URLs of media content segment metadata and/or other information stored by a network DVR 106.

3.0 Example Media Device

Figure 1B:
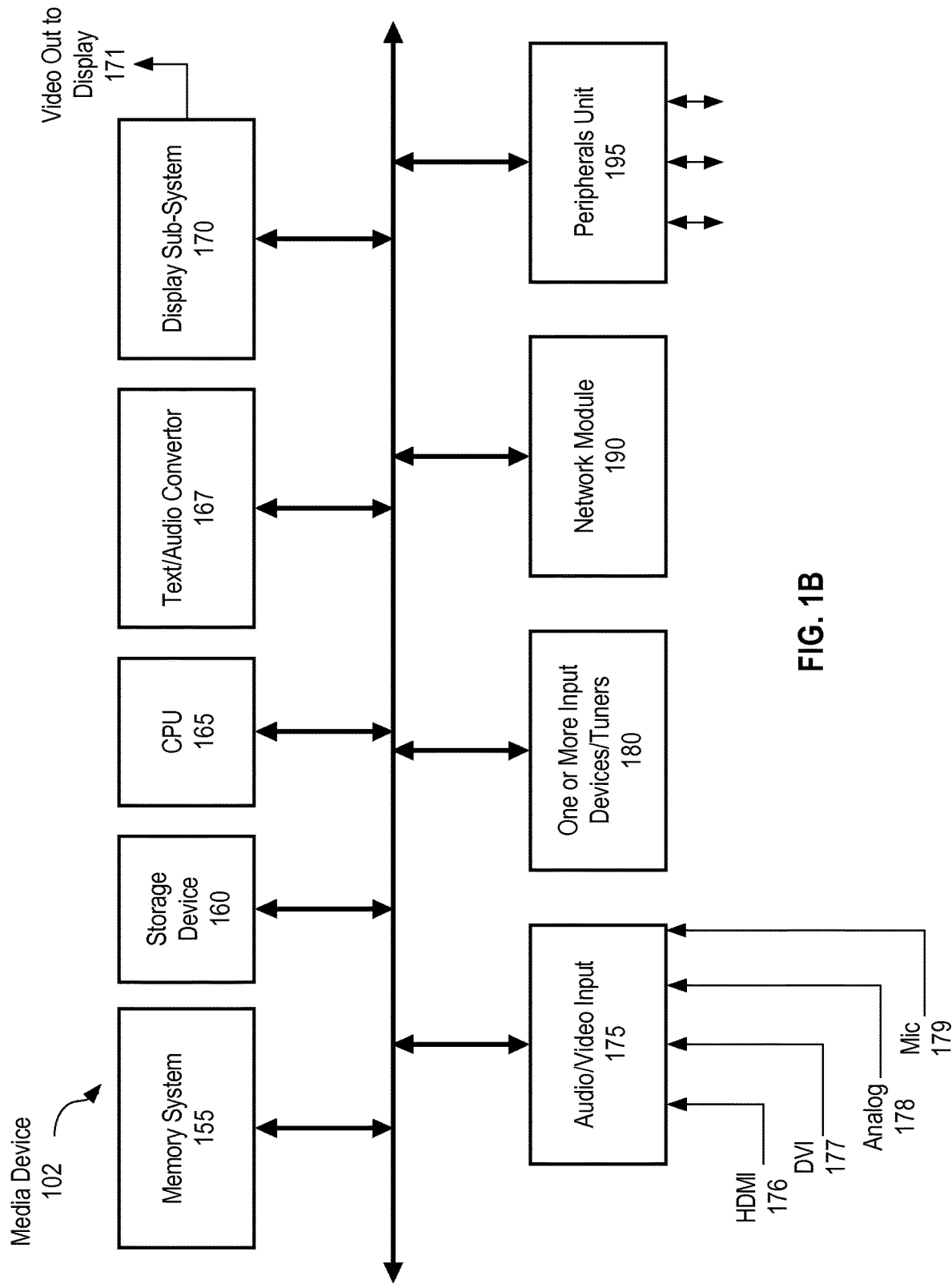
FIG. 1B is a block diagram of an example media device in accordance with one or more embodiments.

FIG. 1B illustrates an example block diagram of a media device in accordance with one or more embodiments. As shown in FIG. 1B, a media device 102 may include multiple components such as a memory system 155, a storage device 160, a central processing unit (CPU) 165, a display subsystem 170, an audio/video input 175, one or more input devices/tuners 180, a network module 190, peripherals unit 195, text/audio convertor 167, and/or other components used to perform the functionality described herein. In an embodiment, a media device 102 may be a DVR. The functionality of a DVR is typified in U.S. Pat. No. 6,233,389, entitled "Multimedia Time Warping System," which is owned by the Applicant and is hereby fully incorporated by reference. A multifunction media device is described U.S. patent application Ser. No. 12/631,740, entitled "Multifunction Multimedia Device," which is owned by the Applicant and is hereby fully incorporated by reference. Techniques for using voice-based input to operate a media device and to search for media content are described in U.S. patent application Ser. No. 13/665,735, entitled "Method and System For Voice Based Media Search," which is owned by the Applicant and is hereby fully incorporated by reference.

In an embodiment, the audio/video input 175 may correspond to any component that includes functionality to receive audio and/or video input (e.g., HDMI 176, DVI 177, Analog 178) from an external source. For example, the audio/video input 175 may be a DisplayPort or a high definition multimedia interface (HDMI) that can receive input from different devices. The audio/video input 175 may receive input from a set-top box, DVR, a Blu-ray disc player, a personal computer, a video game console, an audio/video receiver, a compact disk player, an enhanced versatile disc player, a high definition optical disc, a holographic versatile disc, a laser disc, mini disc, a disc film, a RAM disc, a vinyl disc, a floppy disk, a hard drive disk, etc. The media device 102 may include multiple audio/video inputs 175.

In an embodiment, the input device/tuner 180 generally represents any input component that can receive a content stream (e.g., through cable, satellite, internet, network, terrestrial antenna, etc.). In a tuner configuration, input device/tuner 180 may allow one or more received frequencies to pass through while filtering out others (e.g., by using electronic resonance, etc.). A television tuner may convert an RF television transmission into digital audio and video signals which can be further processed to produce sound and/or an image or accept digital signals such as MPEG2, MPEG4, etc.

In an embodiment, input may also be received from a network module 190. A network module 190 generally represents any input component that can receive information over a network (e.g., internet, intranet, world wide web, etc.). Examples of a network module 190 include, but are not limited to, any of: a network card, network adapter, network interface controller (NIC), network interface card, wireless card, Local Area Network adapter, Ethernet network card, any other component that can receive information over a network, etc. The network module 190 may also be used to directly connect with another device (e.g., a media device, a computer, a secondary storage device, etc.).

In an embodiment, input may be received by the media device 102 from any communicatively coupled device through wired and/or wireless communication segments. Input received by the media device 102 may be stored to the memory system 155 or storage device 160. The memory system 155 may include one or more different types of physical memory to store data. For example, one or more memory buffers (e.g., an HD frame buffer) in the memory system 155 may include storage capacity to load one or more uncompressed high definition (HD) video frames for editing and/or fingerprinting. The memory system 155 may also store frames in a compressed form (e.g., MPEG2, MPEG4, or any other suitable format), where the frames are then uncompressed into the frame buffer for modification, fingerprinting, replacement, and/or display. The memory system 155 may include FLASH memory, DRAM memory, EEPROM, traditional rotating disk drives, etc. The storage device 160 generally represents secondary storage accessible by the media device 102. The storage device 106 may include, but is not limited to, any combination of, one or more of: Solid State Drives (SSD), hybrid hard drives, hard drives, etc.

In an embodiment, central processing unit 165 may include functionality to perform the functions described herein using any input received by the media device 102. For example, the central processing unit 165 may be used to dynamically derive fingerprints from media content frames stored in the memory system 155. The central processing unit 165 may be configured to mark or identify media content or portions of media content based on tags, hash values, fingerprints, time stamp, or other suitable information associated with the media content. The central processing unit 165 may be used to modify media content (e.g., scale a video frame, etc.), analyze media content, decompress media content, compress media content, etc. A video frame (e.g., an HD video frame, 4K frame, etc.) stored in a frame buffer may be modified dynamically by the central processing unit 165 to overlay additional content (e.g., information about the frame, program info, a chat message, system message, web content, pictures, an electronic programming guide, video content, textual content, or any other suitable content) on top of the video frame, manipulate the video frame (e.g., stretching, rotation, shrinking, etc.), or replace the video frame in real time. Accordingly, an electronic programming guide, advertisement information that is dynamically selected, media content information, or any other text/graphics may be written onto a video frame stored in a frame buffer to superimpose the additional content on top of the stored video frame. The central processing unit 165 may be used for processing communication with any of the input and/or output devices associated with the media device 102. For example, a video frame that is dynamically modified in real time may subsequently be transmitted for display. The central processing unit 165 may be used to communicate with other media devices to perform functions related to synchronization, publication of data, etc.

In an embodiment, the text/audio convertor 167 generally represents any software and/or hardware for converting text to audio and/or for converting audio to text. For example, the text/audio convertor may include functionality to convert text corresponding to closed captioned data to an audio file. The audio file may be based on a computerized voice, or may be trained for using the voice of a user, a fictional or non-fictional character, etc. In an embodiment, the automatically generated voice used for a particular message may be the voice of a user generating the message. The text/audio convertor may include functionality to switch languages when converting from voice to text or from text to voice. For example, audio input in French may be converted to a text message in English.

In an embodiment, the peripherals unit 195 generally represents input and/or output for any peripherals that are communicatively coupled with the media device 102 (e.g., via USB, External Serial Advanced Technology Attachment (eSATA), Parallel ATA, Serial ATA, Bluetooth, infrared, etc.). Examples of peripherals may include remote control devices, USB drives, a keyboard, a mouse, a microphone, and voice recognition devices that can be used to operate the media device 102. In an embodiment, multiple microphones may be used to detect sound, identify user location, etc. In an embodiment, a microphone may be a part of a media device 102 or other device (e.g., a remote control) that is communicatively coupled with the media device 102. In an embodiment, the media device 102 may include functionality to identify media content being played (e.g., a particular program, or a position in a particular program) when audio input is received (e.g., via a microphone) from a user.

In an embodiment, the display sub-system 170 generally represents any software and/or device that includes functionality to output (e.g., Video Out to Display 171) and/or actually display one or more images. Examples of display devices include a kiosk, a hand held device, a computer screen, a monitor, a television, projector, etc. The display devices may use different types of screens or display technology such as a liquid crystal display, cathode ray tube, a projector, a plasma screen, etc. The output from the media device 102 may be specially for formatted for the type of display device being used, the size of the display device, resolution (e.g., 720i, 720p, 1080i, 1080p, or other suitable resolution), etc.

Figure 2:
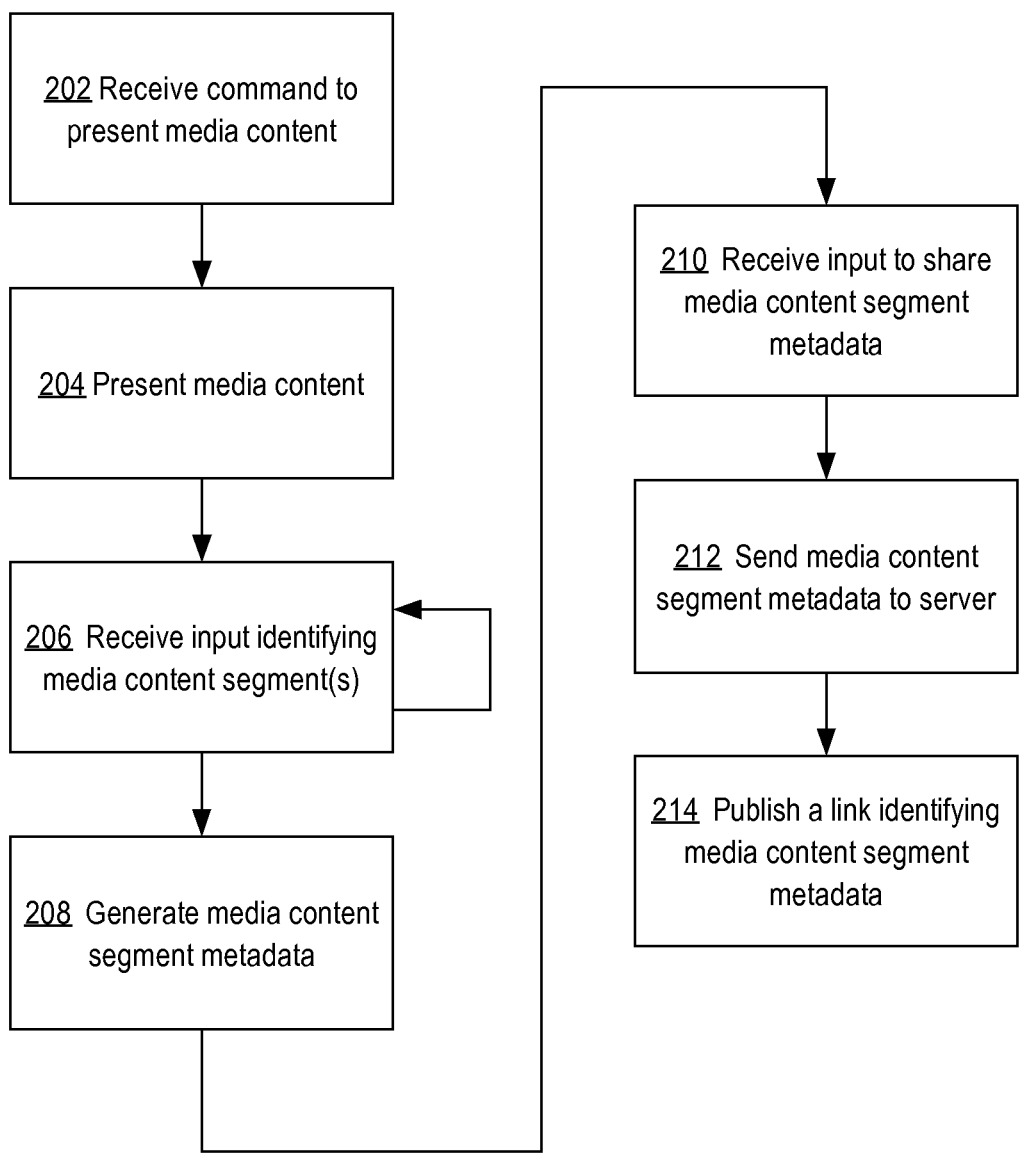
FIG. 2 depicts an example flow for creating and sharing media content segment metadata in accordance with one or more embodiments.
Figure 3:
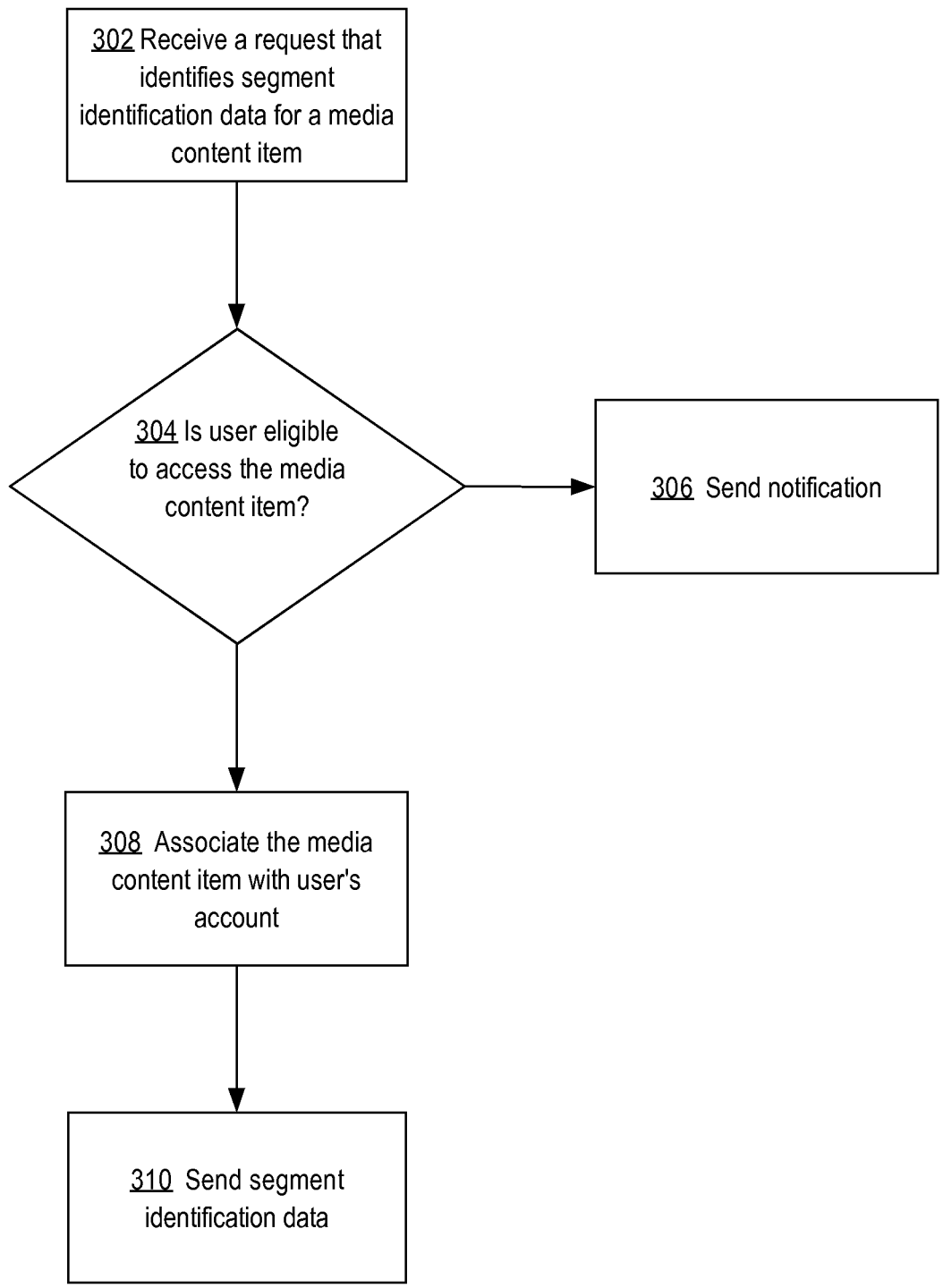
FIG. 3 depicts an example flow for managing media content segment metadata in accordance with one or more embodiments.
Figure 4:
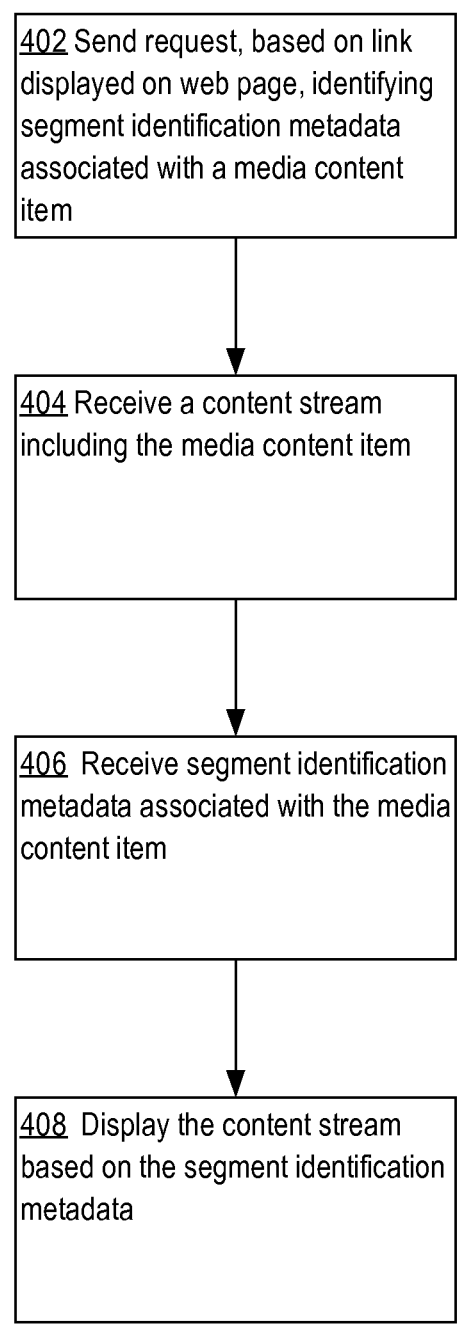
FIG. 4 depicts an example flow for playing a media content item on a media device based on media content segment metadata in accordance with one or more embodiments.

4.0 Creating and Sharing Media Content Segments 4.1 Creating Media Content Segments FIG. 2 depicts an example flow for creating and sharing media content segment metadata in accordance with one or more embodiments. Steps shown in FIG. 2 may be rearranged or omitted. Furthermore, additional steps not shown in FIG. 2 may be performed in accordance with one or more embodiments. Accordingly, the selection or arrangement of steps shown in FIG. 2 should not be construed as limiting.

In an embodiment, a media device receives a command to present media content (Step 202). The media device may be a local media device (e.g., a DVR, portable device, game console) or a remote media device (e.g., a network DVR, a VOD library, or a third party video library). The command to present the media content may be received as a selection in an electronic programming guide (EPG), in a list of recorded media content items, or other listing of available media content. The media content may be content stored locally in memory of the media device (e.g., a DVR may receive a command to play a stored program recording), or the command may be to play media content that is accessible over a network (e.g., a network DVR may receive a command from a portable media device to play media content stored by the network DVR, NAS, etc., in association with the user's account). In one embodiment, a command to present the media content may be received from a user that desires to identify particular segments in the media content; for example, a user may desire to identify and share with friends particular segments of an internet-accessible video, a video operator may desire to identify segments of a movie for editing purposes, or an advertiser may desire to identify segments of a television program for the placement of ads.

In an embodiment, the requested media content is presented (Step 204). For example, a media device 102 or network DVR 106 may cause display of the media content on a display device that is connected to a media device 102 (e.g., a television display that is connected to a DVR) or on a display that is part of the media device 102 itself (e.g., a display screen of a tablet computer).

In an embodiment, a status bar may be overlaid onto the media content presented in Step 204. The status bar may be displayed automatically in response to the playing of the media content or in response to user input. For example, if a user is viewing the media content on a touchscreen device, the user may cause a status bar to be displayed by touching the touchscreen during playing of the media content. As another example, if a user is viewing the media content on a television display, the user may cause a status bar to display by pressing a button a remote control device. In an embodiment, a status bar overlaid on media content may include one or more graphical elements including, but not limited to, a play mode indicator (e.g., indicating whether the media content is currently playing, recording, paused, fast forwarding, rewinding, etc.), a play progress bar, a segment indicator button, and a volume indicator. The play progress bar may include a current play position indicator that indicates a current play position in a media content program. Examples of a play progress bar are described in U.S. Pat. No. 6,847,778, entitled "Multimedia Visual Progress Indication System," which is owned by the Applicant and is hereby fully incorporated by reference. In an embodiment, a segment indicator button provides a graphical element that may be selected by a user to create, modify, save, and/or share media content segments identified by the user.

In an embodiment, the media device receives input identifying one or more media content segments (Step 206). For example, during the playing of a media content item, a user may desire to identify a new media content segment in the media content item. In one embodiment, the user may select a segment indicator button on the status bar to identify the segment. In response to a user selecting the segment indicator button, a start point indicator and a stop point indicator may be displayed on the play progress bar. The start and stop point indicators may be used to specify a start point and an end point of a segment in the media content. For example, a user may be interested in a particular scene of a television program the user is watching. In the example, the user can select a segment indicator button and position a start point indicator at the beginning of the scene and a stop point indicator at the end of the scene to define a segment, or "clip." A user may provide input selecting a segment indicator button and to adjust a start and stop point indicator using a remote control, a touch interface, or any other input device.

In one embodiment, time marks may be displayed in the vicinity of a play progress bar to indicate a time associated with a current play position indicator and, if displayed, each of a start and stop point indicator. The time marks may provide the user with a visual reference of points in the media content identified by the current play position indicator and start and stop point indicators. As a user adjusts the position of a start or stop point indicator, the displayed time marks may automatically update to indicate newly identified points in the media content. In an embodiment, as a user adjusts the position of the start and stop point indicators, display of the multimedia program content may scan with the user's adjustments to the indicators. For example, as the user adjusts the position of the start point indicator from one position to another, the display of the multimedia content may scan in sync with the position indicated by the start point indicator, enabling the user to more precisely identify a segment. Examples interfaces for identifying a segment in media content is described in U.S. patent application Ser. No. 11/285,402, entitled "Digital Video Recorder Video Editing System," which is owned by the Applicant and is hereby fully incorporated by reference.

In an embodiment, a user may identify any number of media content segments for a particular media content item. For example, a user may identify a collection of scenes from a movie or television program by repeating one or more of the steps described above to identify multiple media content segments. In an embodiment, each identified media content segment may be of any length and identified media content segments may overlap one another. A user may also modify previously identified segments by further adjusting start and stop point indicators for a particular segment, or the user may delete previously identified segments using the segment indicator or another input control.

In an embodiment, a user may identify media content segments for any number of separate media content items. For example, a user may create a collection of scenes from a television program series by identifying media content segments in multiple episodes of the television program series. In an embodiment, media content segments identified by a user may be grouped together in a logical grouping. For example, a user may create a grouping of media content segments identified in various episodes of a television program by associating media content segments identified by the user in separate episodes with the grouping.

In one embodiment, a media content segment may be identified based on monitoring user activity. For example, a start and/or stop point for a media content segment may be determined by a media device based on monitoring a user's interaction with the media content as the media content is played. During playback of a particular media content item, a user may rewind and replay a particular segment of the media content multiple times and, in response, a media content segment may be automatically identified corresponding to the approximate portion of the media content that was re-played. In an embodiment, automatically identified media content segments may be displayed to the user using start and stop point indicators and the user may provide further adjustments to the automatically identified segment, if desired.

In one embodiment, one or more media content segments may be automatically identified based on fingerprints derived from media content items. For example, fingerprints may be derived from one or more media content items as the content items are played and used to identify particular elements present in the media content items (e.g., a type of car, an actor's face, a song, etc.). Based on the identified elements, segments may be automatically created which correspond to portions of the media content items that contain the identified elements.

In one embodiment, one or more media content segments may be automatically identified based on third party data associated with media content items. One example of third party data may be data that is associated with one or more social networking sites. For example, one or more media content segments may be automatically identified based on detecting a volume of interaction on a social networking site relative to a media content item (e.g., a number of posts or "tweets" that reference a particular media content item). During a football game, for example, an exciting play may generate a noticeable spike in activity on one or more social networks. In the example, a "highlight" segment may be identified based on determining when such spikes in social networking activity occur relative to the airing time of the football game.

In an embodiment, media content segment metadata is generated for one or more identified media content segments (Step 208). For example, the metadata may include information that identifies start and stop points in one or more media content items corresponding to segments identified in a media content item. The media content segment metadata may include, for example, information identifying the media content item(s) with which the metadata is associated, information about a user generating the metadata, information about a media device upon which the metadata is generated. The metadata may include other user-specified information such as a name for the metadata, a group with which to associate the identified media content segments, a description of the identified segments, etc.

In an embodiment, the media content segment metadata may identify content segments using one or more of: time stamps, in-band data (e.g., closed captioning data), fingerprinting, or based on service information (SI) and/or event information tables (EIT). The use of in-band data to synchronize with a multimedia content stream is described in U.S. Pat. No. 7,873,982, entitled "Method And Apparatus For Creating And Viewing Customized Multimedia Segments," which is owned by the Applicant and is hereby fully incorporated by reference. The use of fingerprinting to determine a position in media content is described in U.S. Pat. No. 8,417,096, entitled "Method And An Apparatus For Determining A Playing Position Based On Media Content Fingerprints," which is owned by the Applicant and is hereby fully incorporated by reference.

For example, time stamps may be used to identify a content segment by specifying a start and stop time in a media content item relative to the beginning of the media content item or any other point in a media content item. As an example, a particular media content item may have a total playing time of 15 minutes and a user-identified segment of the media content item may be identified by time stamps of 05:17 and 08:12. In the example, the time stamps indicate that the media content segment corresponds to a portion of the media content item that begins 5 minutes and 17 seconds from the beginning of the media content item and continues until 8 minutes and 12 seconds from the beginning of the media content item. As another example, start and stop times may be identified by hash values extracted from in-band data near the start and stop time points in the media content item. As another example, start and stop times may be identified by fingerprints extracted from the media content item near the start and stop points in the media item. As yet another example, service information or event information tables may be used to reference start and stop points of a media segment.

In an embodiment, generating media content segment metadata may include automatically modifying segments identified by a user so that the identified segments do not overlap certain boundaries in the media content. The boundaries may correspond to time periods close to the beginning and ending points of the media content, the beginning and end of commercial segments, or other defined points in the media content. For example, media content segment metadata may be automatically modified based on boundary rules so that any identified media content segment begins at least 30 seconds after the beginning of a media content item or so that a segment does not overlap with any commercial breaks. The portions in a media content item which may form boundaries for media content item segments may be indicated to a user as the user is identifying the segments, e.g., a graphical user interface may identify the boundaries with markers and/or the interface may restrict the locations that a user is able to place start and stop point indicators.

In an embodiment, input is received to share media content segment metadata (Step 210). For example, a user may select a user interface element or provide other input to share media content segment metadata. In general, a user may share media content segment metadata to enable viewing of identified media content segments on other devices and/or by other users.

In an embodiment, the generated media content segment metadata is sent to a network DVR device or other server that stores the metadata (Step 212). The media content segment metadata may be stored by a network DVR in association with the user's account. By storing the media content segment metadata in association with the user's account, the user later may access the metadata to view identified segments, modify identified segments, and/or select metadata for sharing with other users. In an embodiment, media content segment metadata may be sent directly from one media device to another without storage by a network DVR or other centralized storage location. In one embodiment, sending the generated media content segment metadata may include sending video content corresponding to the segments of the one or more media content items identified by the metadata.

In an embodiment, media content segment metadata may be collected from multiple users and analyzed. For example, media content segment metadata may be received from a plurality of users and that identifies segments for a particular media content item such as a television show. The media content segment metadata from the multiple users may be analyzed to determine popular segments in the particular media content item. For example, media content segment metadata created by several different users may identify approximately the same fifteen-second segment in a media content item. In the example, the media content segment identified by the several different users may be used, for example, as a preview clip for the media content segment. In one embodiment, a popular media content segment may be labeled as a popular segment if a threshold number of users have identified the segment. In an embodiment, popular media content segments may be ranked and displayed to users viewing available clips from a particular media content item. In an embodiment, popular segments may be combined to create a crowd-sourced macro-clip for one or more media content items.

In an embodiment, a link identifying media content segment metadata is published (Step 214). For example, in response to receiving user input to share media content segment metadata, a link and possibly other information related to the media content segment metadata may be published to a web page, sent to other users in a message (e.g., an email, instant message, text message), or otherwise made accessible to one or more other users.

In one embodiment, information related to the media content segment metadata is published as a post on a web page of a social networking website. The post may be posted on behalf of a social networking user account that belongs to a user of the media device upon which the media content segment metadata is generated. For example, the user may be prompted to provide login credentials for one or more social networking websites prior to a post being published. The post may be generated by the user's media device, a network DVR a service, etc. The published post may be publicly accessible or viewable by other users of the social networking website who have access to view posts from the user. For example, the post may be viewed on the user's profile page or as part of a "feed" containing posts from multiple users.

In an embodiment, a published post may include a link such as a uniform resource locator (URL) or other reference to a storage location of the media content segment metadata. The published post may include video content corresponding to the segments identified by the media content segment metadata. In an embodiment, some or all of the media content metadata may be encoded in a link for the metadata. For example, a published link may include parameters that identify a media content item and identify start and end point(s) corresponding to one or more media content segments.

In an embodiment, in response to receiving user input to share media content segment metadata, an alert may be sent to one or more other users. For example, a user may specify a group of one or more other users to whom alerts are sent in response to the user sharing media content segment metadata. In an embodiment, a first user may subscribe to a second user and receive alerts whenever the second user shares media content segment metadata. Selecting an alert may enable a user to access the media content segment metadata and media content item associated with the alert.

4.2 Managing Shared Segment Metadata

In an embodiment, a network DVR receives a request for media content segment metadata associated with one or more media content items (Step 302). For example, the request may be generated in response to a user selecting a link published on a web page or other location, as described above.

In an embodiment, in response to receiving a request from a user for particular segment metadata, the network DVR determines whether the user is eligible to access the one or more media content items associated with the segment metadata (Step 304). The one or more media content items may be associated with a particular content provider or other content sources to which the user may or may not have access depending on the user's account settings. For example, a particular user selecting a segment metadata link may have subscriptions to one or more cable channel packages, "premium" multimedia channels (e.g., SHO, MAX, HBO, etc.), may have purchased a particular movie or other media content item that is streamable on demand, purchased a pay-per-view program, etc. Thus, determining whether the user is eligible to access a particular media content item associated with the segment metadata may include determining a content provider or source of the particular media content item and determining whether the user requesting the media content item has access to content provided by the content provider or source.

Information about content providers to which a user has access may be stored as part of user account information at a network DVR, service, or other location. For example, a user may request media content segment metadata for a television program associated with a premium channel. In response to the request, the network DVR may access account information for the user, possibly via a subscription service server, internal database, etc., to determine whether the user is a subscriber of the premium channel.

In an embodiment, the network DVR may send a notification to the user's media device if the user is ineligible to access the content (Step 306). For example, the notification may indicate that the content is not accessible to the user because the user does not have access to view content from the content provider of the media content. The notification may provide an opportunity for the user to modify or upgrade the user's account so that the user may access the particular media content item.

In an embodiment, in response to determining that the user is eligible to access the media content item, the network DVR may associate the media content item with the user's account or otherwise cause the media content item to be available to the user for viewing (Step 308). Associating the media content item with the user's account may include copying the media content item to the user's media storage space at the network DVR so that the media content is available to the user for streaming or downloading to any of the user's media devices. In an embodiment, if a user has insufficient storage space available to store a copy of the media content item, the user may be prompted to purchase additional storage space for the user's account.

In an embodiment, the network DVR sends segment metadata to the media device requesting the data (Step 310). The metadata may be sent separately from any media content item(s) with which the metadata is associated, or the metadata may be embedded with the media content.

4.3 Viewing Customized Media Content Segments

In an embodiment, a media device may send a request for media content segment metadata associated with one or more media content items (Step 402). The request may be generated, for example, in response to a user selecting a link on a web page of a social networking website or other location. For example, the link may be included in a social networking post or as a part of other information indicating that the link is associated with segment metadata generated by a user. The link may indicate a reference to a network DVR or other device storing the segment metadata.

In an embodiment, the media device receives media content associated with the media content segment metadata (Step 404). The media content may be received over a network from a network DVR, or may be retrieved from local storage. The media content may include one or more media content items or segments of media content items identified by the media content segment metadata. For example, if the media content segment metadata identifies segments of a particular television program, the media content may include the entire particular television program or one or more segments thereof.

In an embodiment, the media device receives segment metadata associated with the media content (Step 406). The segment metadata may be received separately from the media content or as data embedded with the media content. In one embodiment, the segment metadata may be included in a URL. The media device may store the segment metadata for later retrieval and/or editing by the user.

In an embodiment, the media device may display one or more media content items based on the segment metadata (Step 408). For example, a media device may display the one or more media content items based on the segment metadata by causing the media content segments identified by the metadata to be displayed on the media device instead of playing the entire one or more media content items from the beginning to end. The identified segments may be displayed in a particular order specified by the segment metadata, displayed in an order based on when each segment was created, or displayed in any other order. Displaying the identified segments may include displaying descriptive information included in the segment metadata; for example, a user-provided description of a segment, actor information, or any other information associated with the media content may be displayed. In an embodiment, a user of the media device may be able to play other parts of the content item that are outside of any identified segment using the status bar controls.

5.0 Example Implementation

Figure 5A:
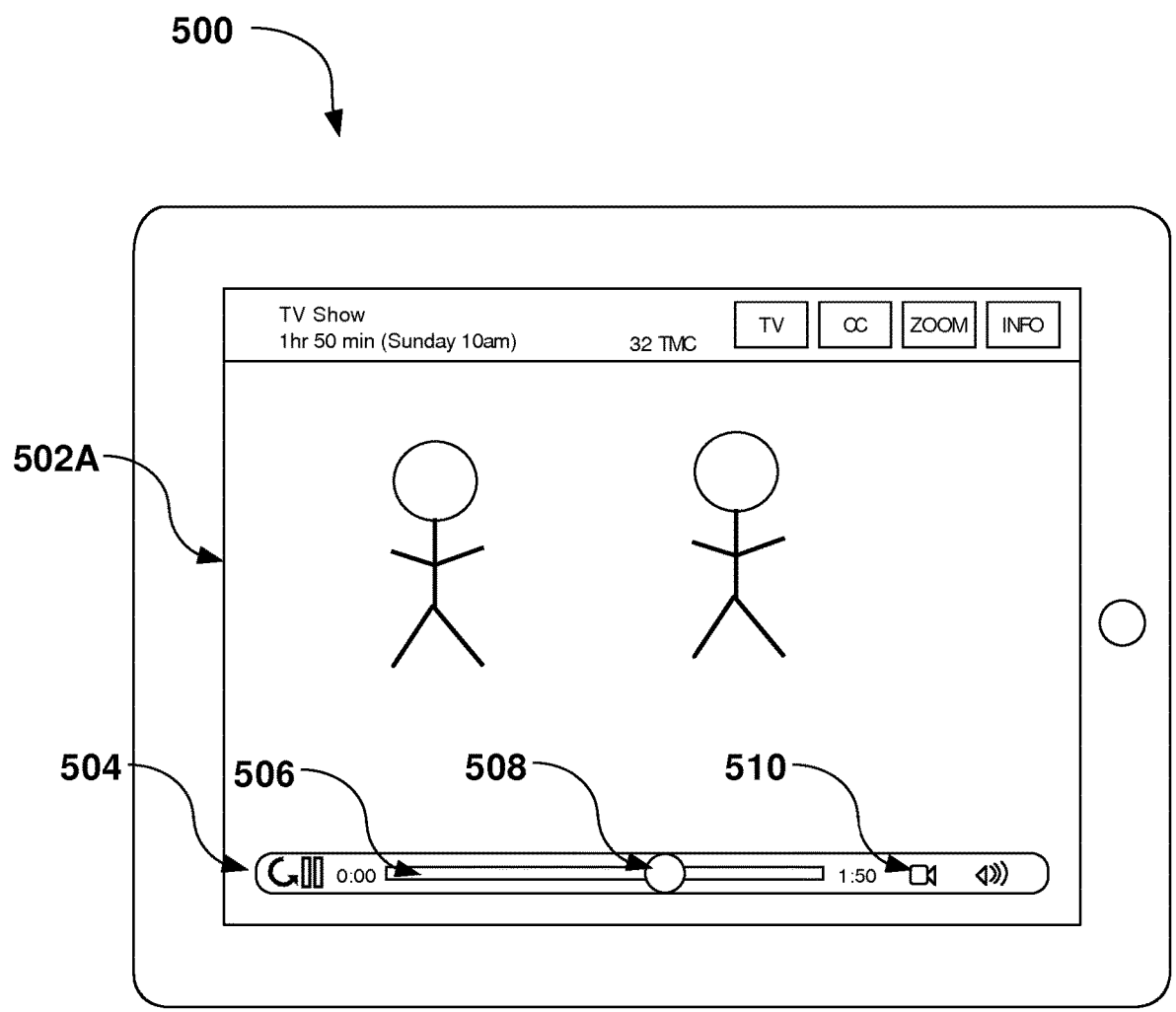
FIGS. 5A, 5B, 5C, 5D, 5E depict example graphical user interfaces for creating and sharing media content segments in accordance with one or more embodiments.
Figure 5B:
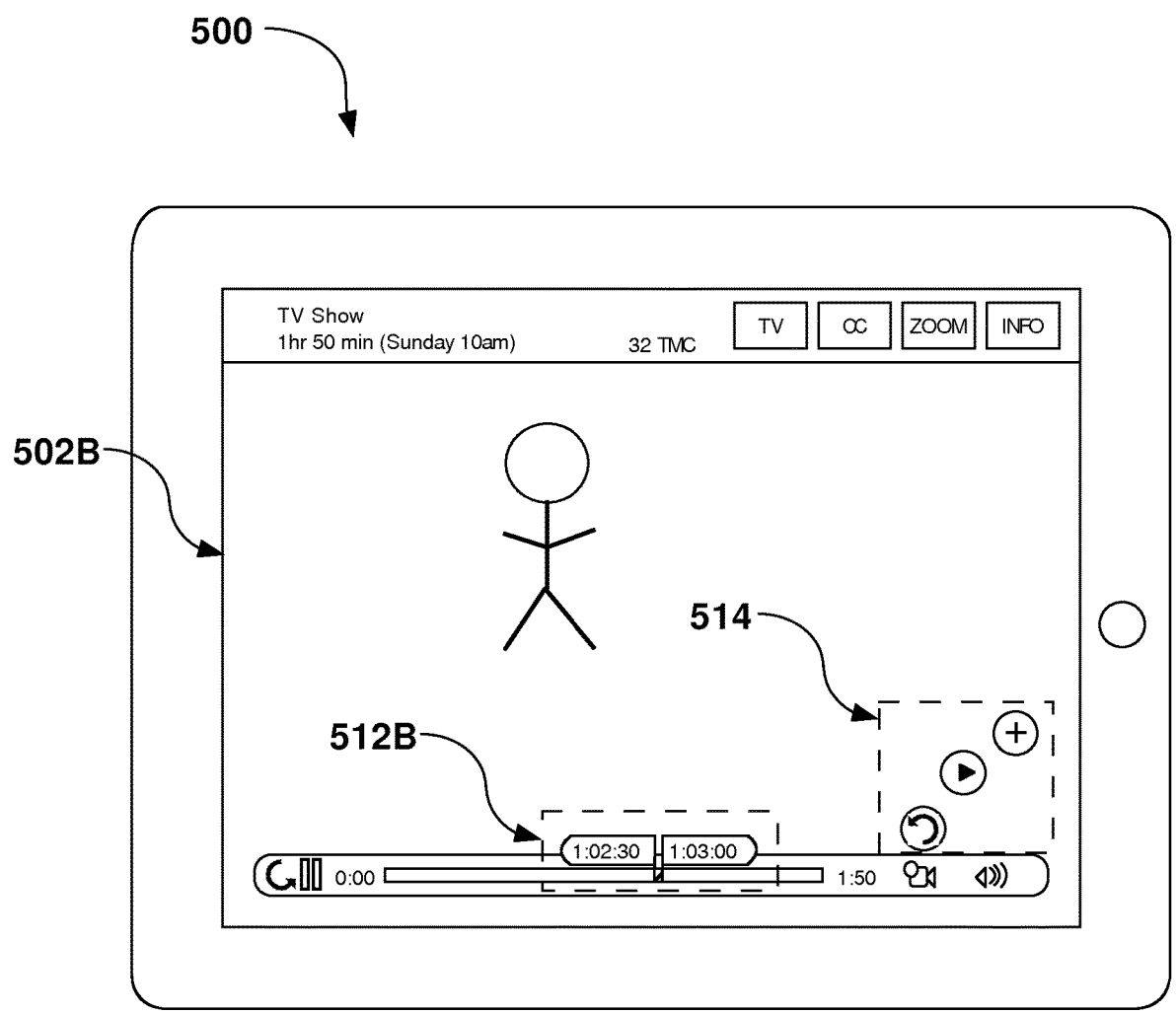
Figure 5C:
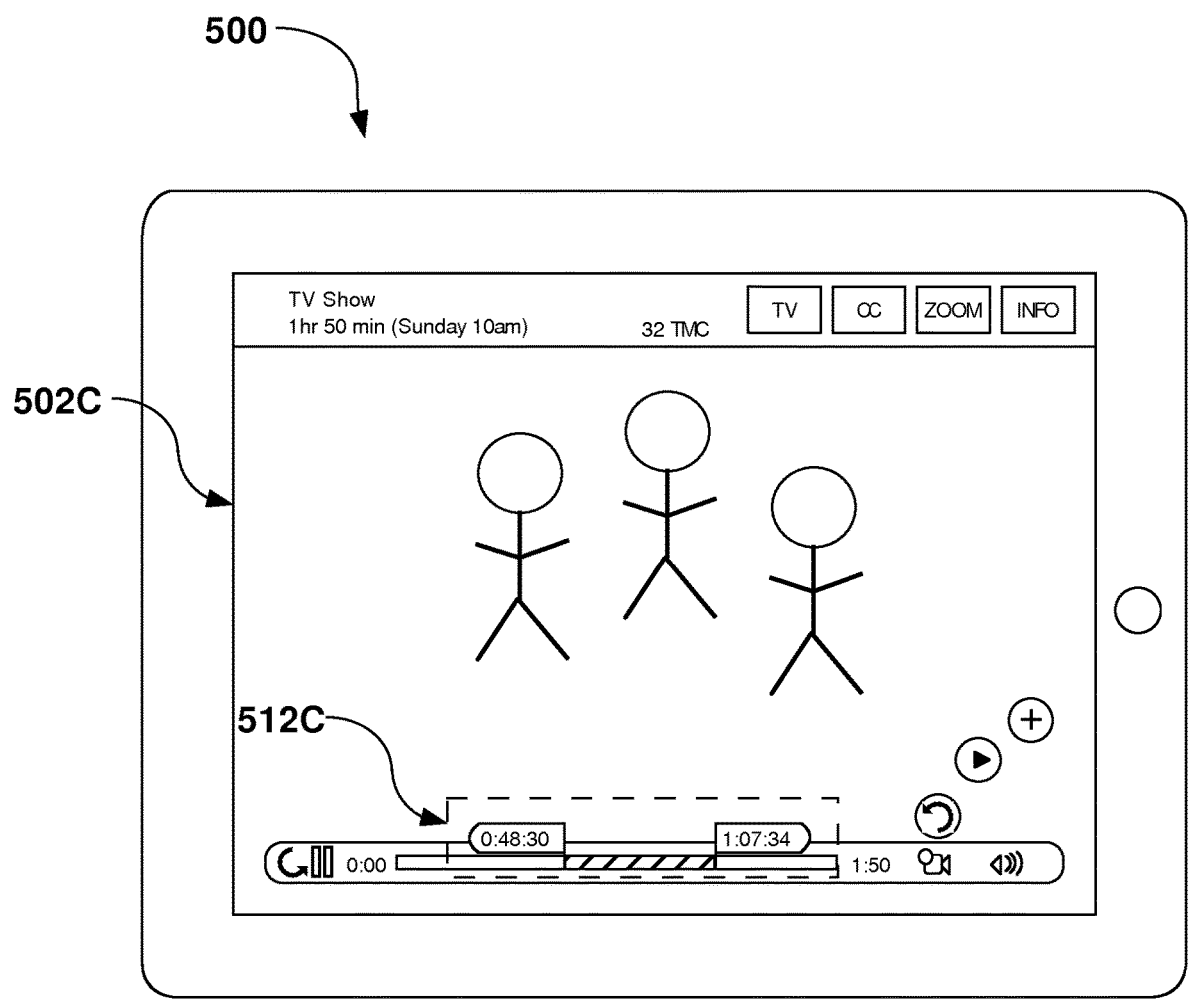

FIGS. 5A-5C illustrate example graphical user interfaces that enable a user to identify media content segments in accordance with one or more embodiments. These examples may skip one or more elements in one or more embodiments for the purpose of clarity and understanding. Furthermore, these examples may include details that may not be necessary when implementing one or more embodiments. Accordingly, these examples should not be construed as limiting in scope.

In an example, FIG. 5A illustrates a display screen 502A of a media device 500. In the example of FIGS. 5A-5C, the media device is depicted as a portable device with a built-in display, such as a laptop, tablet computer, or smartphone; however, in general, any media device may be used to perform the examples described herein. The display screen 502A includes a status bar 504, play progress bar 506, play position indicator 508, and segment action indicator 510. Display screen 502A, shown at a particular display position indicated by play position indicator 508, generally displays media content items as requested by the user. For example, media content items displayed on display screen 502A may be displayed in response to a user providing input to play particular media content items stored on media device 500 or accessible to media device 500 from a network DVR or other remote source.

In general, status bar 504 enables a user to indicate actions with respect to the playing of media content on media device 500. For example, play progress bar 506 and play position indicator 508 provide information about the current play point in a particular media content item. Play position indicator 508 may be adjusted by a user to scan the playing of the media content and to set the current play point to a different position. Segment action indicator 510 enables a user to indicate actions related to identified media content segments, as described further below.

FIG. 5B illustrates a display screen 502B of media device 500 with interface elements displayed that enable a user to identify one or more media content segments. The display screen 502B of the media device 500B includes media content segment indicators 512B and segment action indicators 514. The media content segment indicators 512B and segment action indicators 514 may be displayed, for example, in response to a user indicating a desire to identify a new segment by selecting the segment action indicator 510 of FIG. 5A.

In an embodiment, media content segment indicators 512B include a start point indicator and a stop point indicator represented visually as tabs that overlay the play progress bar and that display time marks in association with each indicator. A user may modify the location of the tabs by selecting a tab (e.g., using a touch interface, remote control, or other input device) and moving the tab to a new location on the progress play bar, thereby modifying the boundaries of an identified segment of the media content item. The portion of the media content item identified by media content segment indicators 512B may correspond to a media content segment of interest to a user of media device 500, for example, a scene of a television show the user wishes to share with others.

In an embodiment, segment action indicators 514 are displayed and may be associated with various actions with respect to a media content segment identified by media content segment indicators 512B. For example, a user may select an appropriate segment action indicator 514 to reset the position of the media content segment indicators 512B, to begin playing a currently identified segment, to save a currently identified segment, or to share a saved segment with other users.

FIG. 5C illustrates a display screen 502C of media device 500 including modified media content segment indicators 512C. For example, media content segment indicators 512C may be displayed in response to a user moving to a different location both the start and stop point indicators illustrated for media content segment indicators 512B of FIG. 5B. In response to a user moving the start and stop point indicators, the time marks associated with the indicators may update to indicate the new positions.

Figure 5D:
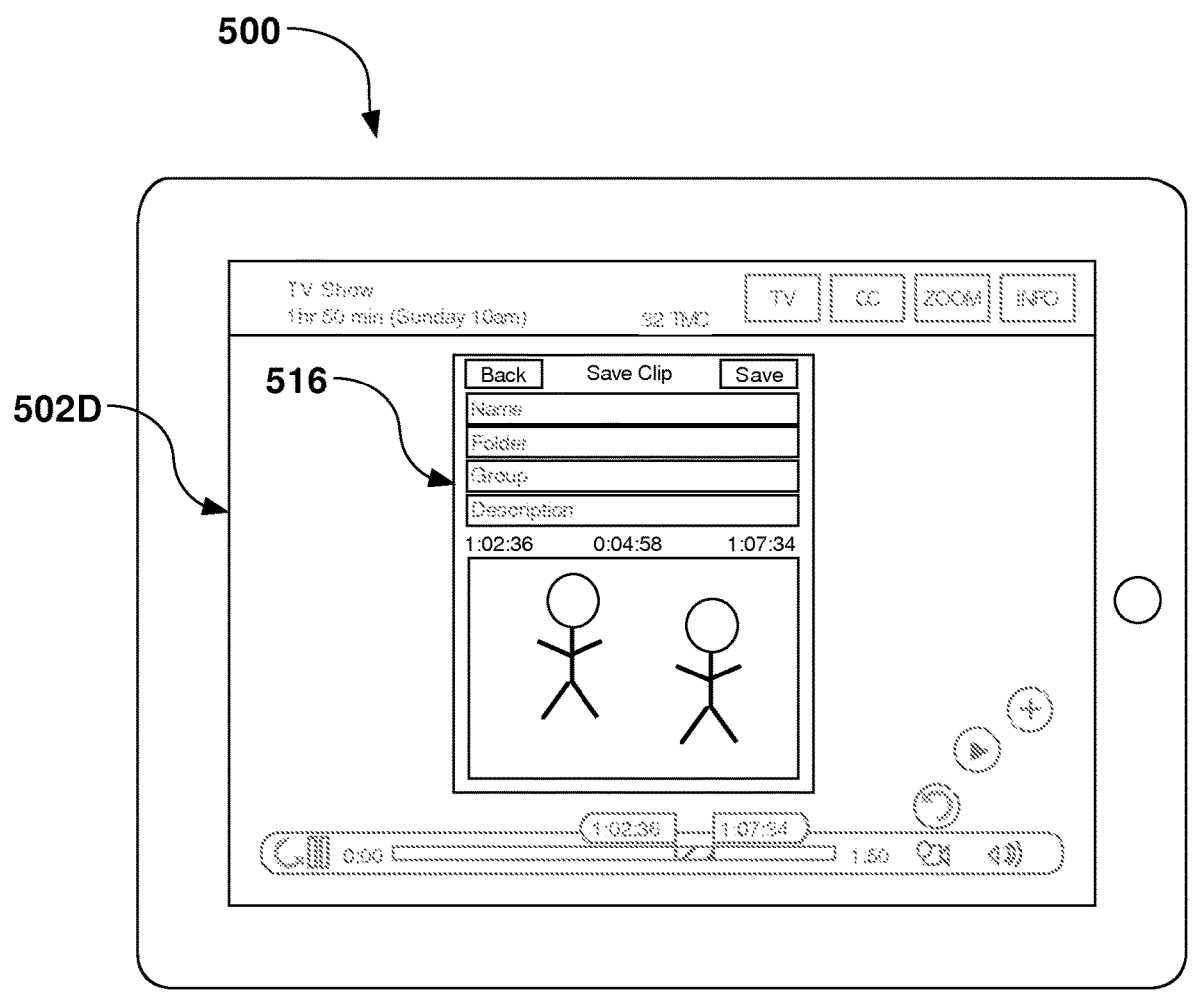

FIG. 5D illustrates a display screen 502D of media device 500 including a media content segment save panel 516. Media content segment save panel 516 may be displayed, for example, in response to a user identifying a particular media content segment and selecting a segment action indicator to save the identified media content segment. Media content segment save panel 516 provides several input fields that enable a user to provide information about the media content segment being saved including a name for the segment, a content segment folder and/or group with which to associate the media content segment, and a description of the identified segment. An indication of a time range and a preview image associated with the media content segment may be displayed in media content segment save panel 516. In response to the user selecting input to save the media content segment, media content segment metadata may be generated and saved locally on media device 500 and/or sent to a network DVR or other remote storage location.

Figure 5E:
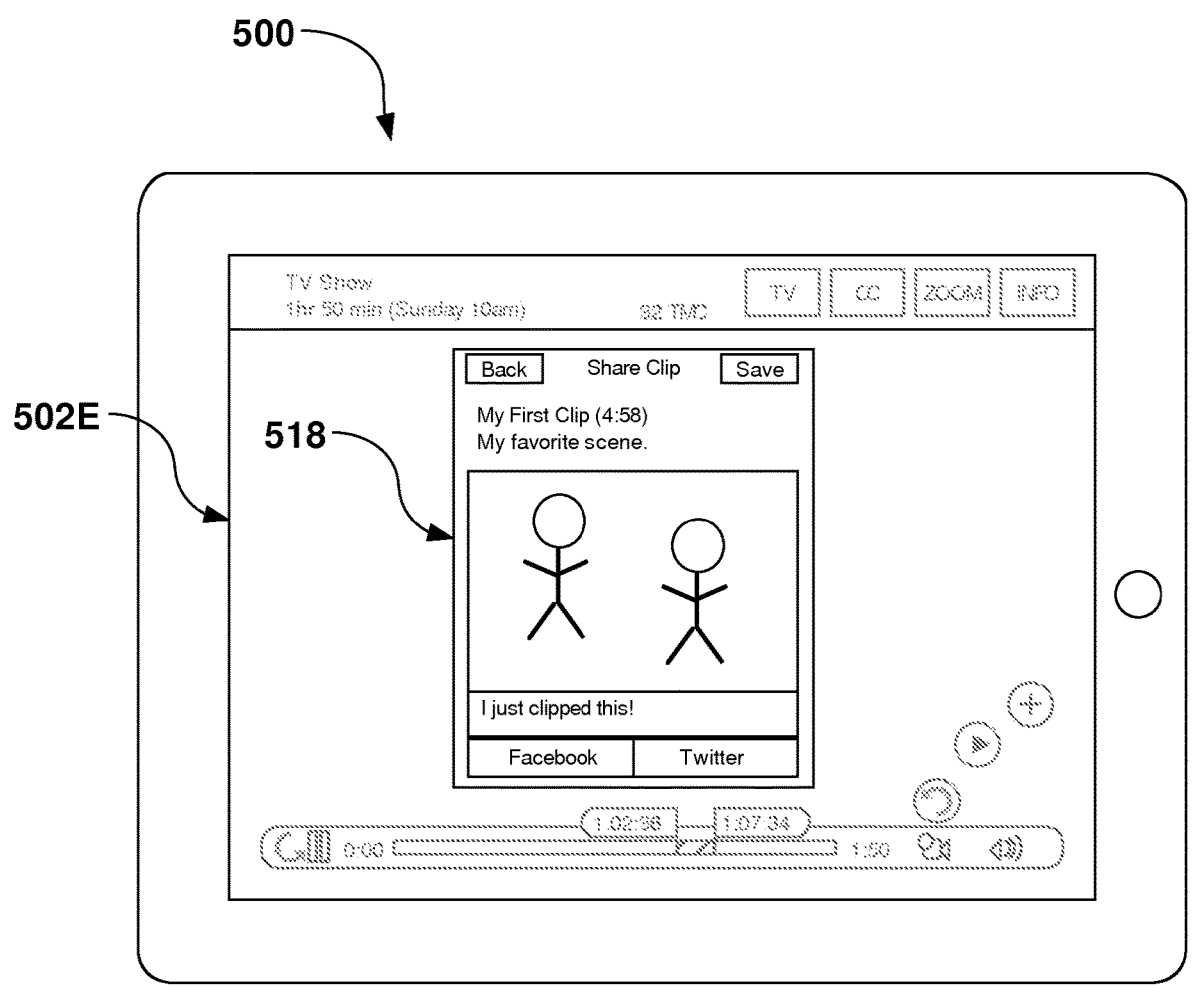

FIG. 5E illustrates a display screen 502E of media device 500 including a segment share panel 518. Segment share panel 518 may be displayed, for example, in response to a user saving a media content segment using the media content segment save panel 516 of FIG. 5D or selecting other input to share media content segment metadata. Segment share panel 518 may display information about the media content segment metadata to be shared including a preview image and other information provided by the user in media content segment save panel 516. Segment share panel 518 may provide input fields that enable a user to provide information to be displayed when the media content segment is published to a web page of a social networking website or other resource. Input elements may be provided that enable the user to select a particular method for publishing information about the media content segment metadata.

Figure 6:
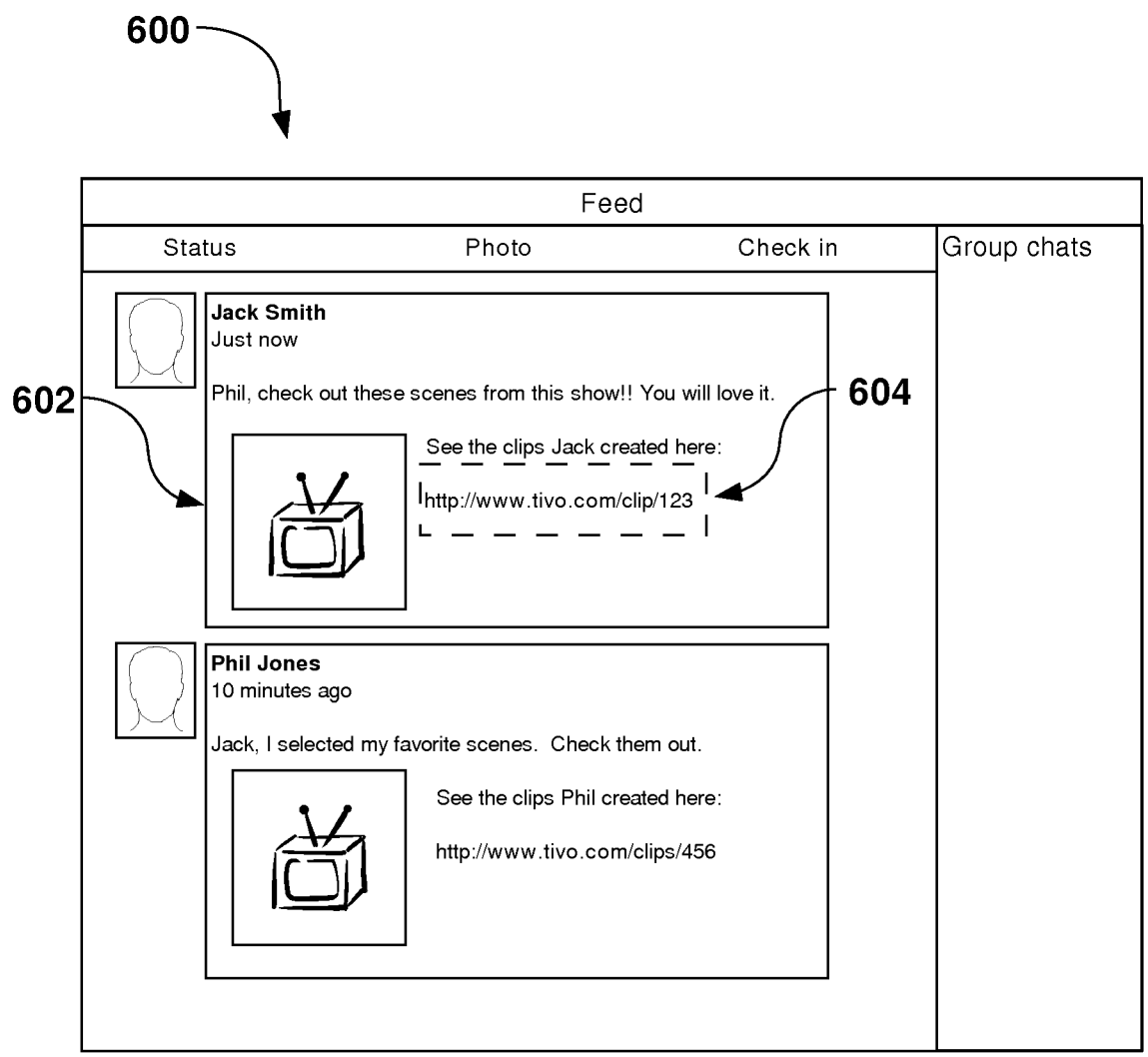
FIG. 6 depicts an example web page interface including links to shared media content segment metadata in accordance with one or more embodiments.

FIG. 6 illustrates postings published on a web page 600 and providing information about media content segment metadata shared by users. For example, web page 600 includes a post 602 associated with a particular user. Post 602 may be generated in response to the user creating and publishing media content segment metadata for one or more media content items, as described above in FIGS. 5A-5E. In the depicted example, web page 600 is a social networking website; however, web page 600 may be any type of web page (e.g., a blog, a chat room, a data feed, etc.), application screen (e.g., a screen within a social networking application, etc.), or other accessible resource.

Post 602 includes a link 604. In the example, link 604 is a URL that indicates a location of metadata for the media content identified in the post. A user may select the link using a media device thereby causing the media device to send a request to a network DVR or other service identifying the media content segment metadata. The link may cause an application on the media device to open and to begin streaming and playing the media content according to the media content segment metadata identified by the URL.

Note that, although separate embodiments are discussed herein, any combination of embodiments and/or partial embodiments discussed herein may be combined to form further embodiments.

6.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
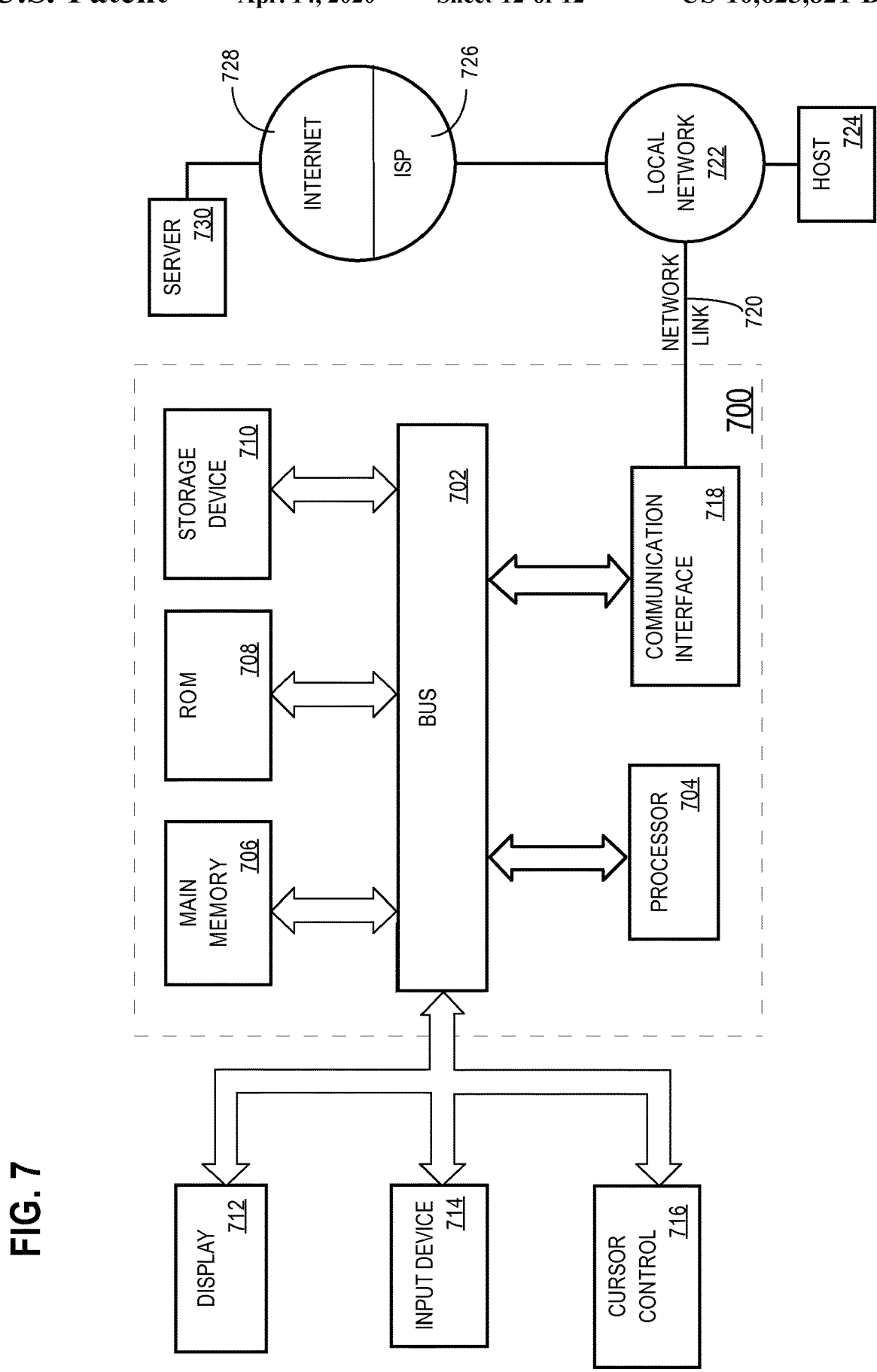
FIG. 7 is a block diagram of a computer system upon which embodiments of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7.0 Extensions and Alternatives

Although specific components are recited herein as performing the method steps, in other embodiments agents or mechanisms acting on behalf of the specified components may perform the method steps. Further, although some aspects of the invention are discussed with respect to components on a system, the invention may be implemented with components distributed over multiple systems. Embodiments of the invention also include any system that includes the means for performing the method steps described herein. Embodiments of the invention also include a computer readable medium with instructions, which when executed, cause the method steps described herein to be performed.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or characteristic that is not expressly recited in a claim should limit the scope of such claim in any way. The specification and drawings are, accordingly, to be regarded in an illustrative rather than a restrictive sense.

What is claimed is:

1. A method comprising:
   causing display of, by a first media device, one or more media content items;
   receiving, at the first media device, data representing input identifying one or more segments of the one or more media content items that are stored at a remote server, the input associated with a particular user;
   generating, based on the input, media content segment metadata that identifies at least one of a start point or an end point associated with each segment of the one or more segments of the one or more media content items; and
   causing posting, on a webpage associated with the particular user, a link selectable to cause retrieval of the media content segment metadata by a second media device, wherein, upon selection of the link on the webpage by another user by way of the second media device:
      the first media device determines whether the another user is eligible to access content provided by a content provider of the one or more segments; and
      in response to determining that the another user is eligible to access the content provided by the content provider of the media content segment:
         the first media device sends the media content segment metadata that are stored separately from the one or more segments, to the second media device, associated with the another user; and
         the second media device retrieves the one or more segments based on the media content segment metadata.

2. The method of claim 1, wherein the media content segment metadata is included in a URL in the link.

3. The method of claim 1, wherein the link indicates a reference to a network DVR storing the media content segment metadata.

4. The method of claim 1, wherein the media content segment metadata identifying the one or more segments is stored on the second media device upon selection of the link by the another user.

5. The method of claim 1, wherein the media content segment metadata identifying at least one of the start point or the end point associated with each segment is further based on one or more of: one or more timestamps, in-band data, one or more fingerprints, or service information.

6. The method of claim 1, wherein the start point of one of the one or more segments is automatically identified by a particular user input, wherein the particular user input comprises replaying the segment from the start point.

7. The method of claim 1, wherein the webpage is a social networking website.

8. The method of claim 1, wherein, for at least one segment of the one or more segments, at least one of a respective start point or a respective end point associated with the at least one segment is automatically modified based at least in part on one or more detected boundaries in the one or more media content items, the one or more detected boundaries based on one or more boundary rules associated with the at least one segment and the input associated with the particular user, the one or more boundary rules associated with the media content segment metadata, wherein a boundary of the one or more detected boundaries corresponds to a commercial segment boundary as indicated in the media content segment metadata.

9. A non-transitory computer readable medium storing instructions, which when executed by one or more processors cause performance of:
  causing display of, by a first media device, one or more media content items;
  receiving, at the first media device, data representing input identifying one or more segments of the one or more media content items that are stored at a remote server, the input associated with a particular user;
  generating, based on the input, media content segment metadata that identifies at least one of a start point or an end point associated with each segment of the one or more segments of the one or more media content items; and
  causing posting, on a webpage associated with the particular user, a link selectable to cause retrieval of the media content segment metadata by a second media device, wherein, upon selection of the link on the webpage by another user by way of the second media device:
    the first media device determines whether the another user is eligible to access content provided by a content provider of the one or more segments; and
    in response to determining that the another user is eligible to access the content provided by the content provider of the media content segment:
      the first media device sends the media content segment metadata that are stored separately from the one or more segments, to the second media device, associated with the another user; and
      the second media device retrieves the one or more segments based on the media content segment metadata.

10. The medium of claim 9, wherein the media content segment metadata is included in a URL in the link.

11. The medium of claim 9, wherein the link indicates a reference to a network DVR storing the media content segment metadata.

12. The medium of claim 9, wherein the media content segment metadata identifying the one or more segments is stored on the second media device upon selection of the link by the another user.

13. The medium of claim 9, wherein the media content segment metadata identifying at least one of the start point or the end point associated with each segment is further based on one or more of: one or more timestamps, in-band data, one or more fingerprints, or service information.

14. The medium of claim 9, wherein the start point of one of the one or more segments is automatically identified by a particular user input, wherein the particular user input comprises replaying the segment from the start point.

15. The medium of claim 9, wherein the webpage is a social networking website.

16. The medium of claim 9, wherein, for at least one segment of the one or more segments, at least one of a respective start point or a respective end point associated with the at least one segment is automatically modified based at least in part on one or more detected boundaries in the one or more media content items, the one or more detected boundaries based on one or more boundary rules associated with the at least one segment and the input associated with the particular user, the one or more boundary rules associated with the media content segment metadata, wherein a boundary of the one or more detected boundaries corresponds to a commercial segment boundary as indicated in the media content segment metadata.

17. A method comprising:
  causing display, by a first media device, one or more media content items;
  receiving, at the first media device, data representing input identifying one or more segments of the one or more media content items that are stored at a remote server, the input associated with a particular user;
  generating, based on the input, media content segment metadata that identifies at least one of a start point or an end point associated with each segment of the one or more segments of the one or more media content items;
  storing the one or more segments at a remote server in a user-defined collection based on an identified metadata element shared among the one or more segments; and
  causing posting, on a webpage associated with the particular user, a link selectable to cause retrieval of the media content segment metadata by a second media device, wherein, upon selection of the link on the webpage by another user by way of the second media device:
    the first media device determines whether the another user is eligible to access content provided by a content provider of the user-defined collection; and
    in response to determining that the another user is eligible to access the content provided by the content provider of the media content segment:
      the first media device sends the media content segment metadata that are stored separately from the user-defined collection to the second media device, associated with the another user; and
      the second media device retrieves the one or more segments based on the media content segment metadata.

18. The method of claim 17, wherein the identified metadata element comprises a fingerprint.

19. The method of claim 17, wherein the identified metadata element comprises a character role in the one or more segments.

20. The method of claim 17, wherein the identified metadata element comprises a song played in the one or more segments.

21. The method of claim 1, further comprising:
  determining, based on similar input to the input associated with the particular user, one or more popular media content segments based on the media content segment metadata, wherein a threshold number of other users have identified the one or more segments through the similar input.

22. The method of claim 21, wherein the one or more popular media content segments are combined to create a crowd-sourced macro-clip for the one or more media content items, and wherein the crowd-sourced macro-clip is made available to users of a network DVR.

23. The method of claim 1, wherein causing posting of the link on the webpage further comprises displaying descriptive information about the one or more segments based on the media content segment metadata.

\* \* \* \* \*